(12) United States Patent
Dewis

(10) Patent No.: US 6,877,323 B2
(45) Date of Patent: Apr. 12, 2005

(54) MICROTURBINE EXHAUST HEAT AUGMENTATION SYSTEM

(75) Inventor: David W. Dewis, Stuart, FL (US)

(73) Assignee: Elliott Energy Systems, Inc., Stuart, FL (US)

( * ) Notice: Subject to any disclaimer, the term of this patent is extended or adjusted under 35 U.S.C. 154(b) by 0 days.

(21) Appl. No.: 10/306,260

(22) Filed: Nov. 27, 2002

(65) Prior Publication Data

US 2004/0098966 A1 May 27, 2004

(51) Int. Cl.[7] .............................. F02C 6/00; F02C 7/10
(52) U.S. Cl. .................... 60/784; 60/39.182; 60/39.511
(58) Field of Search ............................ 60/784, 39.182, 60/39.511

(56) References Cited

U.S. PATENT DOCUMENTS

| | | | | |
|---|---|---|---|---|
| 3,796,045 A | * | 3/1974 | Foster-Pegg | 60/772 |
| 5,212,942 A | * | 5/1993 | Malohn | 60/784 |
| 5,778,675 A | * | 7/1998 | Nakhamkin | 60/652 |
| 6,170,251 B1 | * | 1/2001 | Skowronski et al. | 60/783 |

* cited by examiner

*Primary Examiner*—Charles G. Freay
(74) *Attorney, Agent, or Firm*—Norman Friedland

(57) ABSTRACT

The microturbine engine that is typically utilized to power an electrical generating system and/or boiler, chiller and the like includes a second boiler and a by-pass system for providing heated water at two different levels or where one of the boilers provides steam. The turbine exhaust is utilized as the heat transport medium and is directly connected to one of the boilers while the other is connected to the recuperator. The system can optionally provide cooling to the electrical and electronic components of the system by providing a water circuit for leading water into the electric and electronic components prior to feeding the boilers. The system is designed to assure that the delta heat difference between the medium being heated and the waste heat of the turbine is sufficient so that the heat exchange will be done efficiently.

9 Claims, 3 Drawing Sheets

MICROTURBINE EXHAUST HEAT AUGMENTATION SYSTEM

TECHNICAL FIELD

This invention relates to microturbines engines and more particularly to a system for generating hot water in a boiler and for selectively boosting the temperature of the medium for heat exchange relation by utilizing the turbine exhaust.

BACKGROUND OF THE INVENTION

As one skilled in this art appreciates the microturbine has in the last few years become extremely useful for generating electricity. Typically, the microturbine comprises a compressor, combustor, turbine and a recuperator which serves to pre-heat the compressor discharge air prior to being injected into the combustor. The work produced by the turbine serves to rotate the armature of the electrical generator and an invertor converts the electrical current and controls its frequency. Details of the microturbine can be obtained by referring to co-pending patent application Ser. No. 09/934,640 filed on Aug. 22, 2001 by William R. Ryan entitled *RECUPERATOR FOR USE WITH TURBINE/ TURBO-ALTERNATOR*, published and U.S. Pat. No. 6,314,717 granted to Teets et al on Nov. 13, 2001 entitled *ELECTRICITY GENERATING SYSTEM HAVING AN ANNULAR COMBUSTOR* both of which are commonly assigned to the assignee of this patent application, and both being incorporated by reference herein. Also, for more details of this invention reference should also be made to the microturbines manufactured by the assignee, Elliott Energy Systems, Inc., of Stuart, Fla. and, particularly of the types exemplified by Model Number TA-80.

In certain residential or commercial applications the microturbine can also be utilized for powering a boiler for obtaining hot water or powering a chiller that can be used in a refrigeration absorption system. A simple system for obtaining these objectives is illustrated in FIG. 1 where a boiler is connected to the discharge of the recuperator. The temperature of the engine working medium discharging from the recuperator is typically over 500 degrees Fahrenheit and obviously, this temperature can be utilized wherever heat is needed, given that the heat can be transported efficiently and economically. The simple boiler application will be described hereinbelow in connection with the details of this invention.

This invention contemplates that the microturbine system includes a microturbine engine, a recuperator, an electrical generator and a boiler as described in the immediate above paragraph. This invention augments the above-described simple microturbine/boiler system by incorporating a second boiler. The second boiler can be utilized for the purpose of obtaining hot water at a higher temperature that is available in the single boiler system or obtaining steam. In this system the second boiler is optionally preset so that both of the boilers are in continuously or alternatively is turned-off one of the boilers is rendered inoperative, i.e. all of the turbine exhaust flows into the recuperator and then to the first boiler and by-passes the second boiler. This invention also contemplates utilizing the water for cooling purposes of some of the systems components prior to the water flowing to the boiler.

Another aspect of this invention is the use of the by-pass system to boost the temperature of the waste heat when used as a heat transport medium so as to assure that the delta temperature between this medium and the water is sufficient whereby efficient heat transfer will be effectuated. As one skilled in this technology appreciates, as the efficiency of the microturbine engine increases, the temperature of the exhaust being emitted from the turbine of the microturbine engine becomes reduced. Hence, given the need for a particular delta temperature in the indirect heat exchange relationship occurs, and the temperature of the engine working medium waste is not sufficient in the boiler, the amount of engine working medium waste can be throttled to provide the necessary delta to achieve efficient heat transfer.

This invention should not be confused with the microturbine by-pass system described and claimed in U.S. patent application contemporaneously filed by Gregory Brian Dettmer entitled *MICROTURBINE DIRECT FIRED ABSORPTION CHILLER*, and assigned to a common assignee. This system utilizes the recuperator exhaust heat to power a direct fired absorption chiller which would otherwise be unacceptable without the provisions of the Dettmer invention. In the Dettmer patent application, supra, the system includes a by-pass system for the recuperator, and is uniquely designed to provide a predetermined constant temperature for the direct fired absorption chiller. As mentioned above this by-pass system allows the use of a microturbine which was heretofore not practical since the available temperature for powering the chiller fluctuated.

In the present invention, the purpose of the by-pass system for the recuperator is to flow the turbine exhaust into a heat exchanger or boiler and to divert the turbine exhaust when the heat exchanger is not in operation or is not required. To this end the turbine exhaust is directed directly into the recuperator rather than being directed into the heat exchanger. Obviously, when the temperatures of the working fluids that are in indirect heat exchange relation with each other are at or near parity, the ability to transfer heat is difficult and at best, inefficient. This system serves to increase the output temperature of the recuperator by utilizing the high temperature exhaust from the turbine. That is to say, that the higher temperature turbine exhaust fluid is utilized to boost the usable output temperature. Consequently, the available temperature of the fluid discharging from the recuperator is efficiently increased by virtue of this invention so that useable temperature required for heat transfer is attained.

SUMMARY OF THE INVENTION

An object of this invention is to provide for a microturbine engine that utilizes a recuperator and is designed to generate electricity and run a water boiler to include in the system a second boiler that serves to either obtain hot water that may be hotter than the water in the first boiler and/or steam.

A feature of this invention is to mechanically adjust the flow of turbine exhaust into the second boiler by-passing that amount of flow entering the recuperator or alternatively, by-pass the second boiler so that all of the turbine exhaust flow enters the recuperator.

A still further feature of this invention is to provide a control system that throttles the turbine exhaust to maintain the desired temperature in the first and second boiler.

A still further feature of this invention is to provide a system having at least one boiler that utilizes the water from the water source to cool certain components of the microturbine system before entering the boiler for generating hot water.

A still further feature of this invention is to provide for a microturbine as described a by-pass system that boost the temperature of the recuperator/boiler so as to efficiently transfer heat when the temperature of the heat exchange transport fluid is at or close to parity of the other fluid that is in heat exchange relationship.

The foregoing and other features of the present invention will become more apparent from the following description and accompanying drawings.

BRIEF DESCRIPTION OF THE DRAWINGS

FIG. 1 is a schematic illustrating the details of a prior art microturbine system utilized for generating electricity and modified to power a boiler for generating hot water;

FIG. 2 is a schematic illustrating the microturbine system depicted in FIG. 1 and including a second boiler and by-pass system made in accordance with this invention;

DETAILED DESCRIPTION OF THE INVENTION

Figure 3:
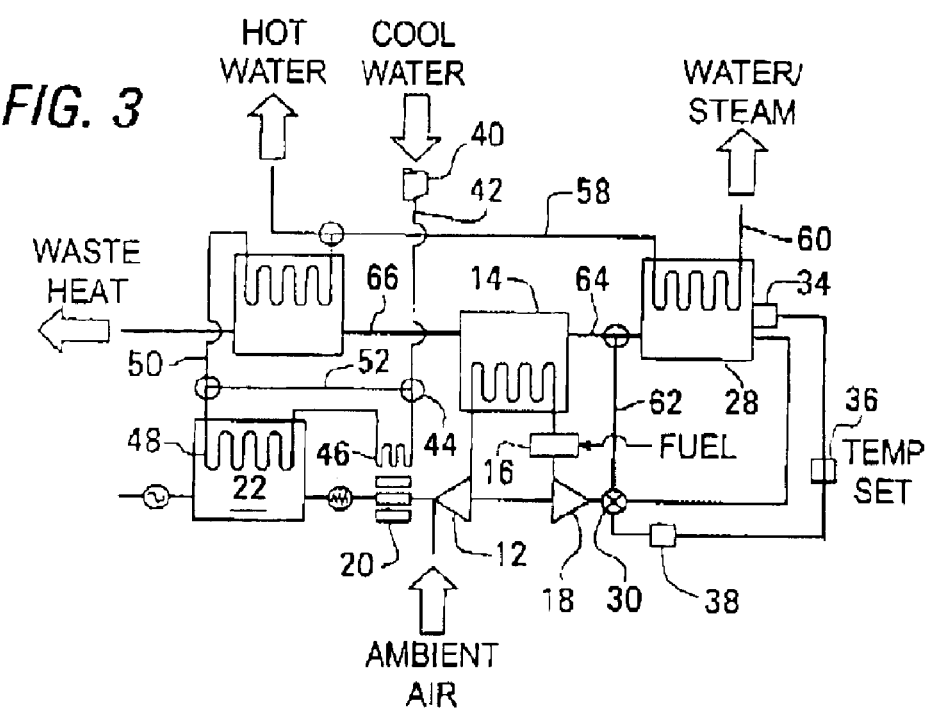
FIG. 3 is a schematic illustration of the system depicted in FIG. 2 modified to provide a controller to maintain the desired heat transfer to both boilers and to assure that sufficient delta heat is maintained between the fluids in heat exchange relation.

While this invention pertains to a microturbine system powering an electrical generator it is to be understood that the microturbine can be utilized for other types of systems and hence, is not limited to an electrical generating system. The microturbine engine has become popular in the last several years and essentially is a jet engine that includes a turbine, compressor, combustor and recuperator. The microturbine is a miniaturized gas turbine engine that in recent years have been almost totally utilized for powering electrical generators. In certain configurations, the turbine and compressor are attached back-to-back on one end of a shaft that is common to the shaft connecting the armature of the electrical generator. Fuel and relatively hot pressurized air discharging from the compressor and pre-heated by the recuperator are fed to an annular combustor where they are combined and combusted to further heat and accelerate the engine's working medium for powering the turbine. The engine working medium is adiabatically expanded in the turbine for extracting energy which, in turn, is utilized for rotating the compressor and armature. The working medium after leaving the turbine is directed to the recuperator where it is placed in indirect heat exchange with the compressor discharge air prior to being admitted into the combustor. The turbine exhaust is ultimately discharged from the recuperator. As mentioned above further details of the microturbine reference should can be had by referring to co-pending patent application Ser. No. 09/934,640 filed on Aug. 22, 2001 by William R. Ryan, supra and U.S. Pat. No. 6,314,717 and the microturbines manufactured by the assignee, Elliott Energy Systems, Inc., of Stuart, Fla. and, particularly of the types exemplified by Model Number TA-80.

Figures 1, 2:
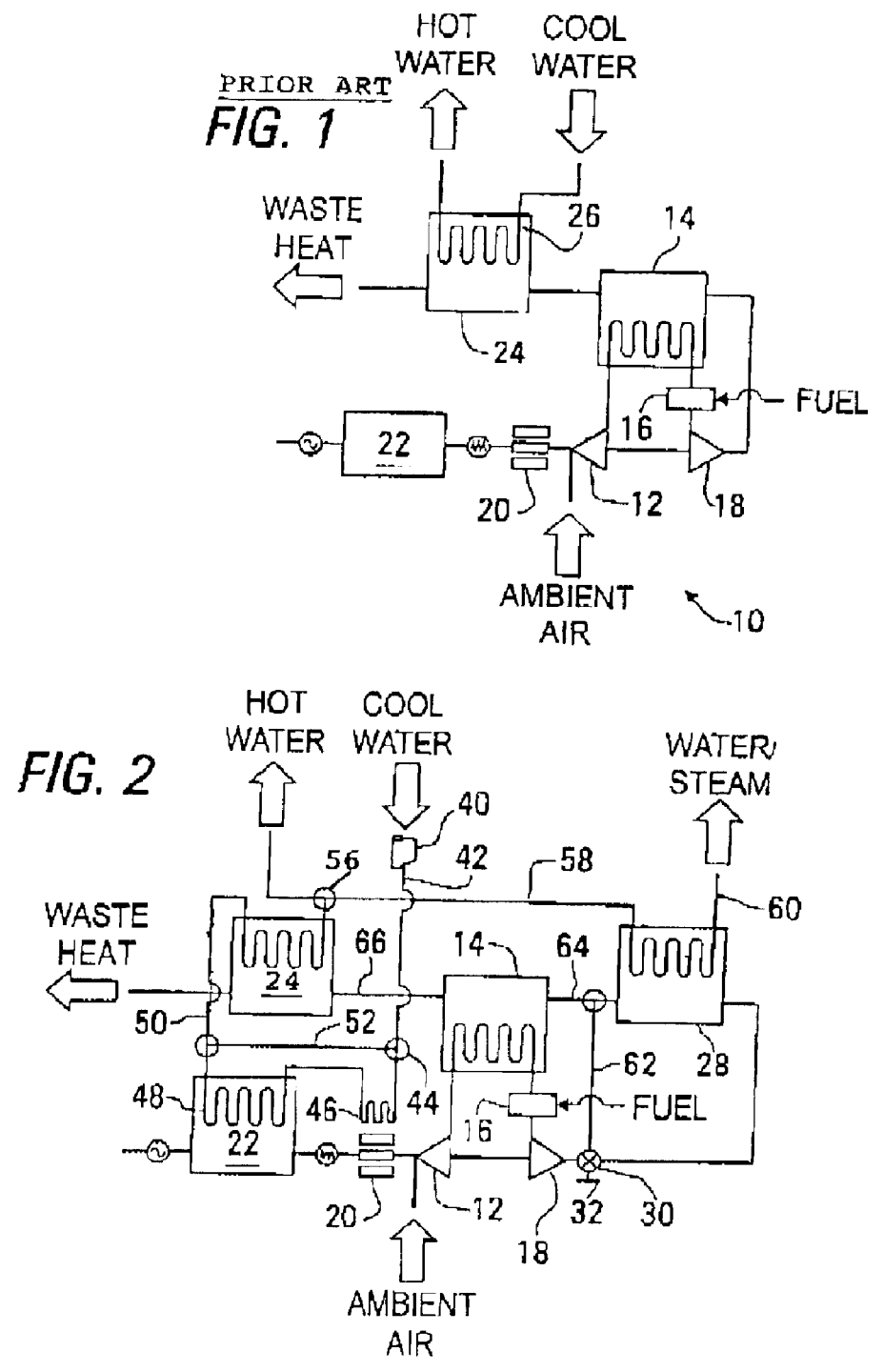

Referring now to the FIG. 1, which is a microturbine system designed to generate electricity to which is added a boiler for generating hot water. The microturbine engine is generally illustrated by reference numeral 10 and includes a compressor 12 for compressing the air admitted therein which is preheated by being placed in indirect heat exchange with the turbine discharged gases in the reucperator 14. The preheated compressor discharge air is combined with a fuel, which could either be a liquid or a gas, in the combustor 16 where it forms a gaseous engine working medium for powering the turbine 18. The turbine 18 drives the compressor 12 and the turbine exhaust gases are routed to the recuperator 14 where it is placed in indirect heat exchange which serves to preheat the compressor discharge air. The power generated by the microturbine 10 serves to power the alternator 20 which through an inverter and associated electronic circuitry 22 produces the desired electrical output. This system just described is an illustration on how the microturbine/electrical generating system can simply be modified to take advantage of the energy of the high temperature turbine exhaust and obtain hot water by routing the exhaust through heat exchanger or boiler 24 which is indirect heat exchange with the water circuit 26.

According to this invention and as shown in FIG. 2, another boiler 28 is added to the microturbine system in order to obtain either water at a hotter temperature than is available at the boiler 24 or steam. For this modified system by-pass valve 30 is connected between the boiler 28 discharge and the discharge end of the turbine 18 (the same reference numerals are used to identify the same or similar elements depicted in all of the Figs.) so that opening valve 30 will dump turbine exhaust gases directly in the heat exchanger or boiler 28. Hence, the waste heat from the turbine can be utilized directly in the heat exchanger 32 or directed into the recuperator 14 or a portion of the water heat from the turbine can be directed in the recuperator 14 while the remaining portion can be directed to boiler 28. By-pass valve 30 may be either operated manually by adjusting handle 32 or automatically (see FIG. 3) by including a suitable temperature sensor 34, a comparator or controller 36, which could be digital or analog, and an actuator 38. All of these elements are commercially available and a description thereof, for the sake of convenience and simplicity, is not included herein. Suffice it to say that the temperature sensor 34 measures the temperature of the waste heat and relays a signal to the controller 36. The controller that has been set to a particular temperature schedule, measures the difference between the actual temperature measured by the temperature sensor 34 and a desired temperature. This output of the comparative signal is then relayed to actuator 38 that adjusts the by-pass valve to proportion the flow of waste heat to assure the proper temperature of the waste heat in the heat exchanger and hence maintain a difference in heat between the waste heat and the medium being heated so as to assure that the heat transfer efficiency is satisfactory.

In this system, the microturbine not only powers the alternator for generating electricity, it is also functions to provide heat and cooling to the system components as is needed and as is compatible with the efficiency of the system. As disclosed herein, the fluid flow circuitry for both hot waste exhaust and water will be described immediately hereinbelow, it being understood that the water can be obtained from the public available water system or from storage containers or it may be from a process where water is cycled continuously. The water circuit flows from the inlet 40, through line 42 and is divided by the divider valve 44 to flow in heat exchanges 46 and 48 for cooling the alternator and inverter 20 and electronic components 22, respectively, and then flows through line 50 and combines with the divided flow in line 52 and directed into boiler 24.The water in boiler 24 is in indirect heat exchange with the hot waste heat discharging from recuperator 14 An outlet valve 56 serves to tap hot water from boiler 24 as desired and the size of outlet valve is selected so that continuous water flow via line 58 is directed to the boiler 28. Hot water or steam is tapped from boiler 28 vial line 60. It is apparent from the foregoing that the water circuit not only cools the electrical and electronic equipment, but also allows tapping hot water from boiler 24 and hotter water or steam from boiler 28.

The heat is delivered to the boiler 24 via lines 62, 64 and 66. The temperature of the waste heat in line 66 is predicated on the output of the recuperator 14. Obviously, the main purpose of recuperator 14 is to pre-heat the compressor discharge air and the remaining energy in the waste heat fluid serves to power the boiler 24 and hence, the temperature of the water in the boiler 24 is determined by the outlet temperature of the recuperator 14 and the flow of the waste heat is continuous, and hence, since the residence time of the waste heat fluid in boiler 24 is limited and the amount of heat at the discharge end of the recuperator is limited, the boiler 24 is incapable of reaching temperature sufficient to obtain steam.

The inclusion of the boiler 28 in accordance with this invention, augments the system by generating water that can be hotter than the water in boiler 24 or can be steam. The by-pass system serves to control the heat transfer in boiler 28. For example, valve 30 can be fully opened and permit all of the turbine exhaust fluid to enter the boiler 28. Since the residence time of the water remaining in the boiler 28 is determined by tapping the water in line 60, the temperature of this water can easily reach the boiling temperature of 212° F. and become saturated to produce steam.

It is apparent from the foregoing description that the water medium is in indirect heat exchange with the turbine discharge air as it flows through the recuperator 14, the boilers 24 and 28 and since the by-pass valve can control the amount of heat transported to either or both boilers, the system can be designed to assure that the use of this energy is done efficiently. Hence, where the temperature difference between the medium being heated (water) and the waste heat is close to each other, the by-pass valve is utilized to assure that the delta temperature is sufficient to obtain effective heat transfer by boosting the boiler's working medium by adding turbine exhaust directly to the boiler 28.

Figure 4:
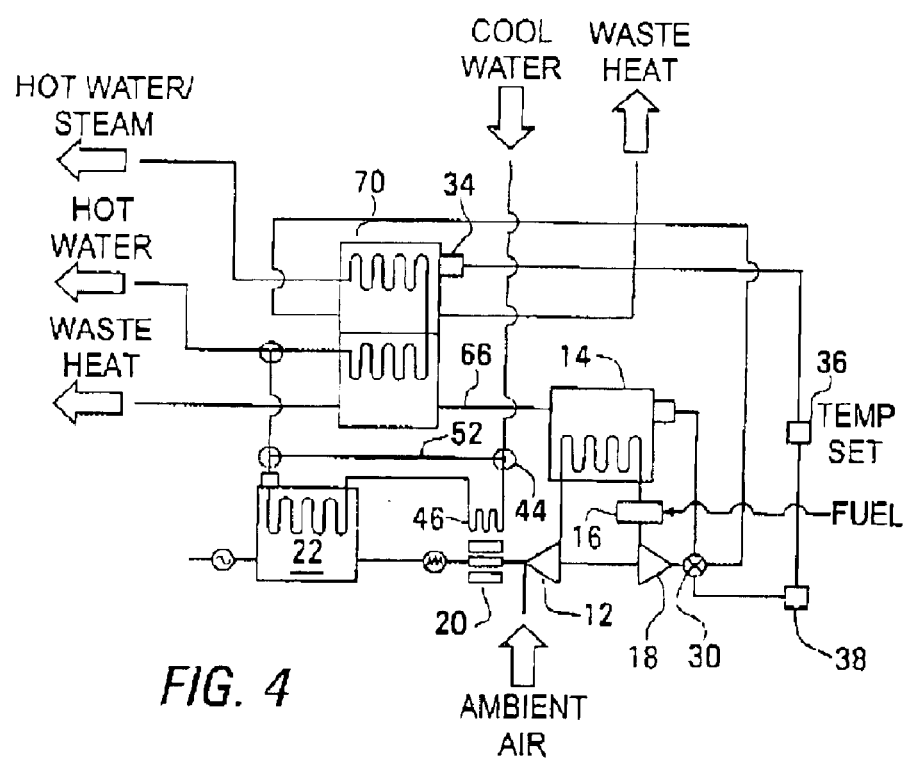
FIG. 4 is a schematic illustration of another embodiment of this invention where the second boiler is mounted in tandem with the first boiler.

FIG. 4 exemplifies another embodiment of this invention where the boilers are mounted in tandem or "piggy back" to lower the cost of the system and make it more efficient. In this embodiment, the function of boilers 24 and 28 are combined in the tandem boiler 70. Both systems, i.e. the system depicted in FIG. 3 and the system depicted in FIG. 4 are identical to each other. The only difference is that the boiler 70 contains two water coils that are in indirect heat exchange with the turbine discharge air and the turbine discharge air after being spent in the recuperator 14. For the sake of simplicity and convenience details of the description of this system is omitted and the description of FIG. 3 is incorporated herein by reference.

What has been shown by this invention is a system for obtaining higher temperature water and/or steam by adding a second boiler and a by-pass valve for regulating the turbine waste heat that is in heat exchange relation with the water in the additional boiler. The system is designed to assure good heat transfer notwithstanding the fact that the efficiency of the microturbine engine is increasing. Hence, the turbine exhaust is utilized to the boost of the output temperature of the working fluid in the boiler to assure that the temperature difference between it and the water will provide efficient heat transfer.

Although this invention has been shown and described with respect to detailed embodiments thereof, it will be appreciated and understood by those skilled in the art that various changes in form and detail thereof may be made without departing from the spirit and scope of the claimed invention.

It is claimed:

1. For a microturbine system having a recuperator and a turbine, and including at least one first boiler for heating a fluid in indirect heal exchange with the heat exhaust from said turbine, the improvement comprising a second boiler, a by-pass valve disposed between said turbine and said second boiler, said by-pass valve operatively connected to said turbine for selectively directing the heat exhaust from said turbine into said second boiler so as to be in indirect heat exchange with a fluid therein, into said recuperator or a portion thereof in both said second boiler and said recuperator, said first boiler connected to the second boiler whereby the fluid in indirect heat exchange with said second boiler is at a higher temperature than the fluid in indirect heat exchange in said first boiler.

2. For a microturbine system as claimed in claim 1 wherein the fluid in said heat exchange that is indirect heat exchange relation with said waste heat is water.

3. For a microturbine system as claimed in claim 1 including a temperature sensor for measuring the temperature of the waste heat exhaust in said heat exchange, a controller for selecting a desired temperature and producing an output signal that is the difference between the desired temperature and the actual temperature, and an actuator operatively connected to said by-pass valve for controlling the flow of by-pass heat exhaust as a function of said difference.

4. For a microturbine system as claimed in claim 1 wherein said by-pass valve connects turbine beat exhaust to said second boiler so that the heat difference between the medium being heated by indirect heat exchange and the turbine heat exhaust is sufficient so as to achieve adequate heat transfer efficiency.

5. For a microturbine system as claimed in claim 2 including an alternator for generating electricity operatively connected to said turbine and an electronic invertor far changing the current from alternating to direct and a first boiler and a second boiler in serial relationship for directing said water in said firer boiler and said second boiler prior to flowing into said first boiler heat exchange for cooling said alternator and said inverter.

6. A microturbine system including a microturbine engine having a compressor, a turbine, a combustor and a recuperator operatively connected to an alternator for generating electricity, a fuel source for said combustor for generating engine working medium for powering said turbine, said turbine drivingly connected to said compressor and said alternator, the discharge of said working medium front said turbine defining waste heat being fluidly connected to said recuperator and being in indirect heat exchange with the air discharging from said compressor prior to being admitted into said combustor, the improvement comprising a source of water, a first boiler being fluidly connected to the discharge of said waste heat from said recuperator to be in Indirect heat exchange with water from said source, a second boiler, a by-pass valve, said bypass valve being disposed between said turbine and said second boiler and operable to selectively fluidly connect a portion of said waste heat to said second boiler to be in indirect heat exchange with water from said source and to connect a portion of waste heat to said recuperator prior to being connected to said first boiler, or all of said waste heat to said recuperator or all of said heat to said second boiler.

7. A microturbine system as claimed in claim 6 including a temperature sensor for measuring the temperature of the waste heat in said second boiler, a controller for selecting a desired temperature and producing an output signal that is the difference between the desired temperature and the actual temperature, and an actuator operatively connected to said by-pass valve for controlling the flow of by-pass waste heat as a function of said difference.

8. A microturbine system as claimed in claim 6 wherein said controller operates said by-pass valve to control the waste heat to said second boiler so that the heat difference between the water being heated by indirect heat exchange and the waste heat is substantial so as to achieve adequate heat transfer efficiency.

9. A microturbine system as claimed in claim 6 wherein said first boiler and said second boiler are mounted in tandem.

* * * * *